G. MATHESON.
Tubing.

No. 198,035. Patented Dec. 11, 1877.

Witnesses
James J. Johnston
A. C. Johnston

Inventor
George Matheson.
By Johnston & Donn.
his attorneys.

UNITED STATES PATENT OFFICE.

GEORGE MATHESON, OF McKEESPORT, PENNSYLVANIA.

IMPROVEMENT IN TUBING.

Specification forming part of Letters Patent No. 198,035, dated December 11, 1877; application filed May 4, 1877.

*To all whom it may concern:*

Be it known that I, GEORGE MATHESON, of McKeesport, county of Allegheny, and State of Pennsylvania, have invented a new and useful Improvement in Tubing, the same being a new article of manufacture; and I do hereby declare that the following is a full and exact description thereof, reference being had to the accompanying drawings, and to the letters of reference marked thereon.

My invention relates to an improvement in tubing, the same being a new article of manufacture; and consists in enlarging the outer diameter of the same near one or both ends of it, for the purpose of forming an inclined bearing at a point distant from the end or ends, and beyond the screw-threads, or that part usually furnished with the screw-threads, whereby the tubing can be braced and strengthened at the point most likely to break off and made weak by the cutting of the screw-threads.

To enable others skilled in the art to make and use my invention, I will proceed to describe its operation.

Figure 1:
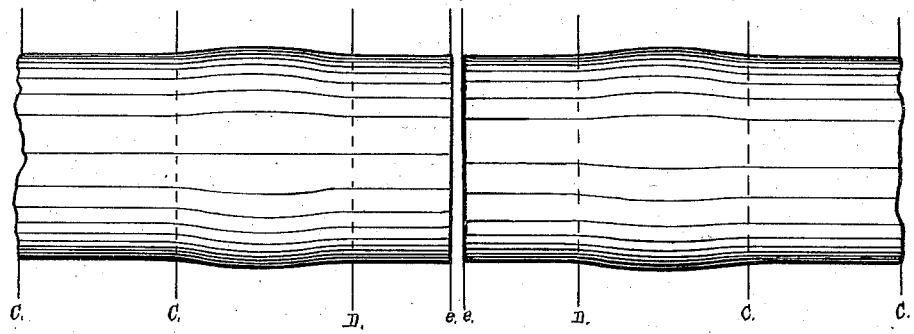
Figure 2:
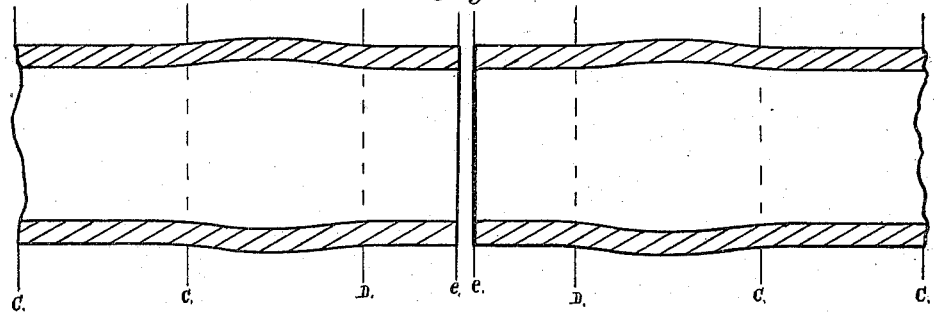
Figure 3:
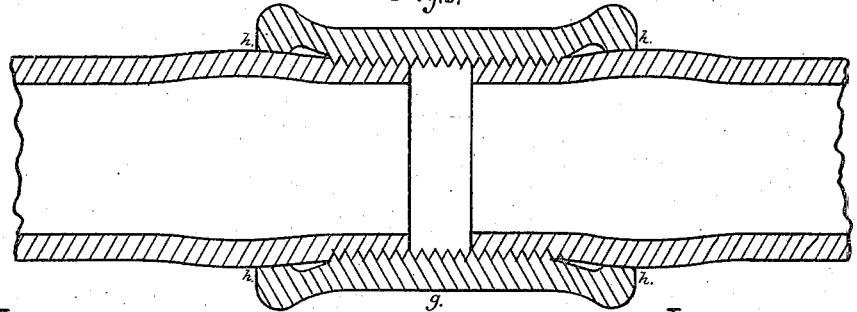

In the accompanying drawings, which form part of my specification, Figure 1 is a side view of my improvement in tubing. Fig. 2 is a longitudinal section of the same; and Fig. 3 represents two parts of my improved tubing, coupled together by a socket or union.

The tubing between the lines C C and between the lines D $e$ are of the same diameter; but that portion between the lines D C is of greater diameter, which may be made by the upsetting process, or by increasing the inner diameter or bore of the tube between the lines D and C, and thereby increasing the outer diameter between said lines D and C. The part of the tube between the lines $e$ and D is the part usually furnished with screw-threads, and the cutting away of the metal in the operation of cutting the screw-threads makes the tube weak at this point; and when two or more pieces of tubing are coupled together by the ordinary socket or union, and the tubing united is subjected to a strain, vibrating, and jarring action, such as is common to the tubing in oil-wells while pumping, the tubing is liable to break off at or near the end of the socket or union, as shown at $g$ in Fig. 3.

By constructing the tubing as hereinbefore described, the end of the socket or union can be extended beyond the screw-threads, so as to impinge on the enlargement, and thereby brace the tubing at a point beyond the place where it is most liable to break off.

The advantage of bracing the tubing by causing the ends of the socket or union $g$ to impinge on the outer walls of the tubing beyond the screw-threads of the tube and socket or union, as shown at $h$, will be very apparent to those having experience in the manipulation of, and in the working of, tubing in deep wells.

Having thus described my improvement, what I claim as of my invention is—

As a new article of manufacture, a tube enlarged at its outer or in its outer and inner diameter at or about the part between the lines C D, substantially as herein described, and for the purpose set forth.

GEO. MATHESON.

Witnesses:
 A. C. JOHNSTON,
 JAMES J. JOHNSTON.